UNITED STATES PATENT OFFICE.

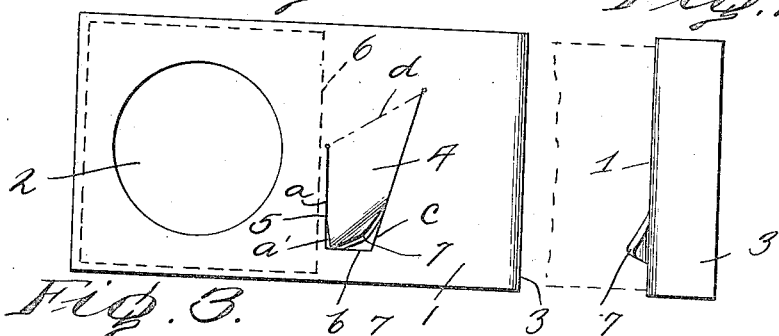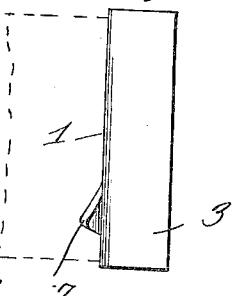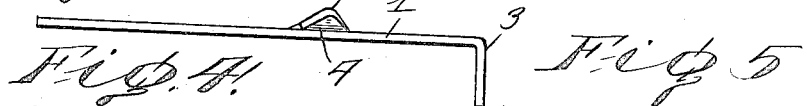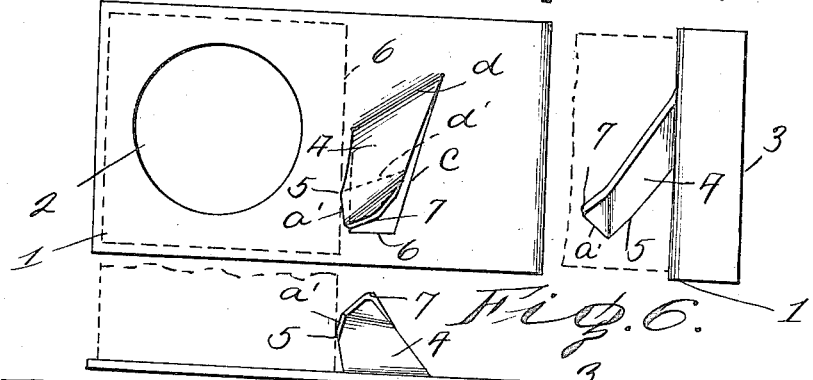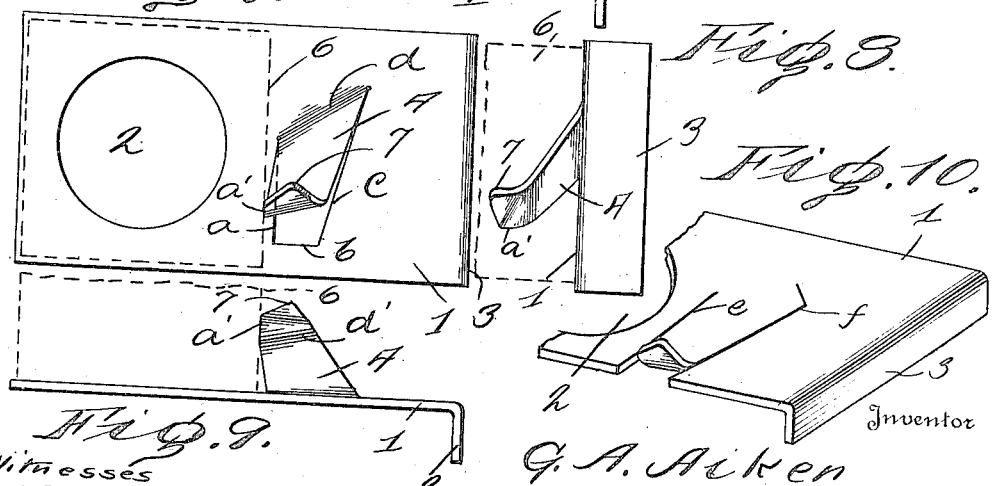

GLENDON A. AIKEN, OF PITTSBURGH, PENNSYLVANIA.

NUT-LOCK.

1,254,461.　　　　　　Specification of Letters Patent.　　Patented Jan. 22, 1918.

Application filed March 15, 1917.　Serial No. 154,989.

*To all whom it may concern:*

Be it known that I, GLENDON A. AIKEN, a citizen of the United States, residing at Pittsburgh, in the county of Allegheny, State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut locks.

The object of this invention is to provide an improved form of nut lock of that type in which a malleable tongue is adapted to be brought into contact with a nut in order to lock the latter.

In those nut locks of the above defined type which are known to me, it is the practice, in one class, to bend a tongue at approximated right angles to the body of the lock plate in order to engage the face of the nut. Where such locking devices are employed it is impossible to straighten the tongue for the purpose of removing the nut more than two or three times without breaking the tongue from the lock plate. In a second class of this type of nut lock as they are known to me, the tongues are located in such position that a locking edge is adapted to coincide with the plane of one of the faces of the nut, which must therefore be accurately positioned in order to permit the tongue to be upturned into locking contact with the face.

In order to overcome the objectionable features of the two classes above defined, I have provided a lock plate from which a tongue is struck in position to be rolled into contact with the face of a nut, the relation of the nut face and the contacting portion being such that, though the nut face is spaced from the locking edge of the tongue, the latter, by reason of its peculiar formation, will be carried into engagement with the nut face.

Furthermore, in this connection, it is the intention to provide such a locking tongue which may be rolled into contact with the face of the nut with an extended bearing, rather than with merely a one point contact, this, also, without accurate positioning of the nut face.

In the construction of the nut lock according to my invention, it is also a desideratum to construct a lock plate in which the above defined features are embodied with a minimum amount of metal, and, with a relatively less amount of metal than is required in the construction of the classes of nut locks above defined as objects of improvement. Thus, in the nut locks of the above classes of this type which have been discussed, the locking tongues are formed from extensions of the lock plate, while in my invention the locking tongues are struck from the body of the plate, so that a more compact and practical nut lock is provided without sacrificing any of the requisite strength of the plate or locking tongue.

With the above and other objects in view, and such others as may hereinafter appear, my invention will now be fully set forth and described, reference being had to the accompanying drawings.

In the drawings:—

Figure 1 is a plan view of my improved nut lock, ready for use,

Fig. 2 is an end view of the lock,

Fig. 3 is a side view,

Fig. 4 is a plan view of the lock, showing the first stage of its operation,

Fig. 5 is an end view,

Fig. 6 is a side view thereof,

Fig. 7 is a plan view of the lock, showing the final stage of its use,

Fig. 8 is an end view,

Fig. 9 is a side view, and

Fig. 10 is a perspective view of a modification.

Referring more particularly to the drawings, 1 represents a base plate or lock plate which constitutes the body of the nut lock. At one end, the lock plate, which is a somewhat elongated element, is provided with the bolt hole 2, and at its opposite end is downturned to form the lock flange 3. Between the bolt hole 2 and the flange 3, and in suitable juxtaposition to the former, a tongue 4 is struck from the body of the lock plate by cutting the metal on three sides of a quadrilateral which extends in a general direction transversely of the plate.

As best indicated in the diagrammatic view, the quadrilateral above mentioned consists of a short side *a*, which extends preferably at right angles to the longitudinal edges of the plate, a short side *b*, which determines the extent of the head or free end of the tongue, an elongated side *c*, which diverges from the side *a* and continues to a point well beyond the rear end of the latter, so that the fourth side *d* of a quadrilateral which constitutes the base of the tongue projects at an acute angle to the side *c* and an obtuse angle to the side *a*. Thus, the tongue 4, in its initial upward bend turns on the dotted line which indicates the fourth side *d* of the quadrilateral.

From a study of the drawings it will be apparent that if the tongue 4 were constructed merely by slitting the metal on the sides *a*, *b* and *c* the corner of the tongue formed by the sides *a* and *b* would be the only point of the tongue to contact with the nut face, when the tongue is bent upwardly upon the side *d*, since the angular projection of the latter causes the tongue to swing over the side *a*, with the forward end of the tongue in advance of the other points of the short side. Therefore, in order to provide a bearing edge of continuous extent on the tongue, it is necessary to modify the tongue in certain particulars. Thus, as shown in Figs. 1 and 4, the side *a* of the tongue is cut away at its forward end to provide a short clear edge or side *a'*. The side *a'* need extend only at a slight angular divergence from the side *a*, or, more particularly, at just sufficient degree to form a point or abutment 5 midway or at an intermediate location on the side *a*, which point will be the first to strike against the side or face of a nut when the tongue is elevated.

Referring now particularly to Fig. 4, in which 6 represents a nut face which will assume a practically parallel position with relation to the side *a*, the latter in the construction of the nut lock appearing in slightly spaced relation to the position which the face of the nut may take, it will be assumed that the tongue has been bent upwardly on the side *d* until the point 5 has come into interlocking contact with the face of the nut. This constitutes the first step in the setting of the lock, and as pictured in Fig. 6 it will be apparent that the upward bending of the tongue on the line *d* will be stopped by the contact of the point 5 with the side of the nut. The further operation in the setting of the nut consists in tapping the end of the tongue 4 with a hammer or other suitable instrument to cause the extreme end of the tongue to turn on a line which is approximately that indicated by the letter *d'*, this line beginning at the point 5 and terminating at an intermediate point of the side *c*. This action causes the end of the tongue to turn or roll toward the face of the nut until the side or edge *a'* lies in full contact with the face, Fig. 7. In preparing the locks for the market, the forward corner of the tongue away from the aperture 2 is turned slightly upward at an angle as indicated at 7 in Fig. 1, this lip 7 providing an entrance for a cold chisel for the initial upturning of the tongue. After the first step in the setting of the lock the diagonal lip 7 provides a surface for the use of a hammer in completing the setting operation.

The modification shown in Fig. 10 operates in identically the same manner as the form already described, and differs in construction only in that the forward end of the tongue is coincident with the edge of the plate, and is formed by cutting the blank into two diverging lines *e* and *f* which correspond to the lines *a* and *c* of the form described as the preferred embodiment, but are of equal length, the side being then sheared at an obtuse angle in the direction of the side *e*, to form the extension cut *f'*. In raising the locking tongue of this form of the device, the same result is secured as in the manipulation of the form of Fig. 1, in which the side *c* is longer than side *a* in a straight line. Obviously the angular arrangement of sides *f*, *f'* may be employed in a tongue struck from the central part of the body instead of being begun at the edge.

From the foregoing description, the manner of operation of the device will be in itself apparent, but it should be additionally noted that the device which is the result of my improved construction permits the locking of the nut by a continuous locking edge, regardless of the angular position of the face within certain prescribed limits. Furthermore, this construction can be successfully carried out with a minimum amount of metal, since its conformation does not include the usual locking extensions or tongues outside of the plate body.

What is claimed is:

1. A nut lock, comprising a base member having a bolt receiving portion provided with a bolt receiving opening and a tongue having a base, which, when the tongue is bent up at said base, will throw the tongue across the limits of the bolt receiving portion and having a longitudinal side edge adjacent the opening and defined by two portions at an angle to each other, the tongue being so located that when bent up on said base, it will contact the apex of the side angle with the side face of a nut upon a bolt in said opening, and the free end portion of the tongue may be subsequently bent to contact the angularly lying side portion of the longitudinal edge of the tongue beyond the angle continuously with said nut face.

2. A nut lock, comprising a base member having a bolt receiving portion, and a tongue lying outside of said bolt receiving portion and having longitudinal sides of unequal length such that when the tongue is bent away from the base it is swung across the area of the bolt receiving portion.

3. A nut lock, comprising a base member having a bolt receiving portion and a tongue lying outside of the limits of the bolt receiving portion, and having a distant longitudinal side and two sides adjacent the bolt receiving portion of lesser extent than the distant side and which determine an outstanding point which will initially strike the sides of a nut resting in the bolt receiving portion.

4. A nut lock, comprising a base member having a bolt receiving portion and a tongue lying outside of the limits of the bolt receiving portion, and having a distant longitudinal side and two sides adjacent the bolt receiving portion of lesser extent than the distant side and which are angularly directed to provide a point for initial engagement with a nut on the bolt receiving portion, and an edge to be rolled into full contact with the side of the nut.

In testimony whereof, I affix my signature.

GLENDON A. AIKEN.

Copies of this patent may be obtained for five cents each, by addressing the "Commissioner of Patents, Washington, D. C."